G. GAY & W. KELLIS.
Cotton-Cleaners.

No. 211,654. Patented Jan. 28, 1879.

WITNESSES:
Arthur E. Perkins.
D. G. Stuart

Geraldus Gay
and
William Kellis
INVENTOR.

J. McC. Perkins
ATTORNEY.

UNITED STATES PATENT OFFICE.

GERALDUS GAY AND WILLIAM KELLIS, OF KELLIS' STORE, MISSISSIPPI.

IMPROVEMENT IN COTTON-CLEANERS.

Specification forming part of Letters Patent No. 211,654, dated January 28, 1879; application filed August 8, 1878.

*To all whom it may concern:*

Be it known that we, GERALDUS GAY and WILLIAM KELLIS, of Kellis' Store, in the county of Kemper and State of Mississippi, have invented certain new and useful Improvements in Cotton-Cleaners; and we do hereby declare that the following is a full, clear, and exact description thereof, that will enable others skilled in the art to which it appertains to make and use the same, reference being had to the accompanying drawings, and to the letters and figures of reference marked thereon, which form a part of this specification.

The same letters and figures of reference are used to indicate the corresponding parts.

After describing the invention, its nature and extent will be shown in the claims.

Our invention has for its object the cleaning of the cotton in the boll. It eliminates the dirt and foreign matter from the cotton and prepares it for ginning.

It consists of an inclined chamber, the top of which is a rectangular cover, and the bottom is composed of slats or rods longitudinally inclined, the bottom being of a semicircular shape. The lower or outer end of these bottom slats is flaring or enlarged, in order to aid the rapid exit of the cotton when ready to be discharged. Within this chamber is a longitudinal shaft having bearings at either end of the chamber. On each face of the shaft, which is square, and at right angles thereto, there is a row of arms or beaters. On the lower half of this central shaft there are four wings or fans—one on each edge of the shaft. On the upper end of the shaft, and just outside of the chamber, is a belt-pulley, by which the power is communicated to the shaft. This chamber is supported on legs at a convenient height from the ground.

Figure 1:
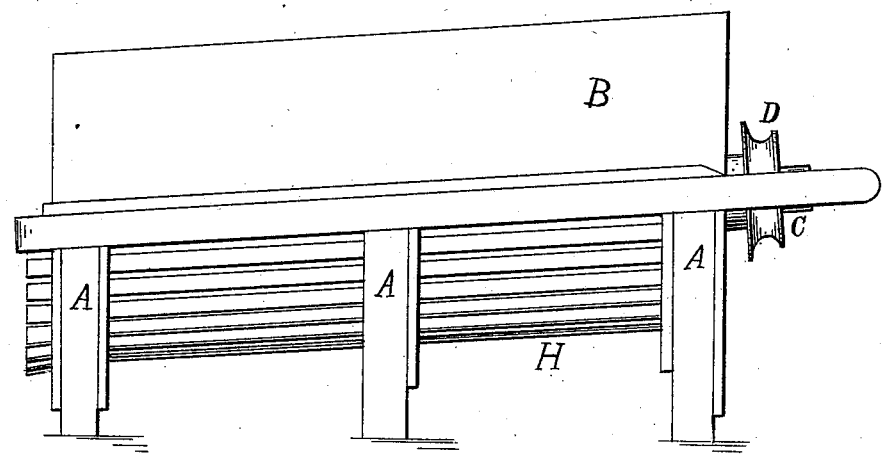
Figure 2:
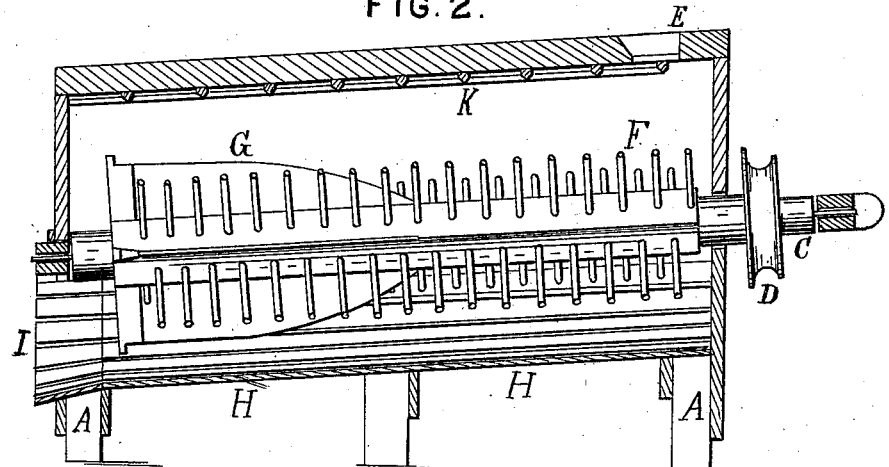
Figure 3:
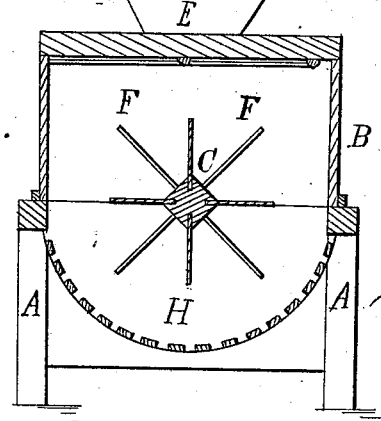

Figure 1 is a side view of a machine embodying our invention. Fig. 2 is a longitudinal sectional view, taken vertically. Fig. 3 is a cross view, taken vertically.

A A are the legs of our cotton-cleaner. B is the cover, on the inside of the top of which are placed the deep diagonal ribs K, which serve to drive the cotton forward as it flies against them. C is the shaft, having gudgeons at either end of the chamber. D is the belt-pulley attached to the upper end of the shaft C. E is the cotton-receiver at the upper end of the cover B. F F are the arms or beaters on the shaft C. G G are the fans on the lower end of the shaft. H H are the slats or rods which form the semicircular floor of the chamber. I is the flaring opening at the lower end of the chamber for the discharge of the cotton.

The fans G G are an essential part of our invention. It is impossible to thoroughly clean the cotton without them. They blow through the slats or ribs all trash and dust, leaving the cotton clean and exempt from all foreign matter before being discharged. They also drive the air out of the discharging-orifice, and thus, by creating a vacuum, force the cotton forward toward the lower or outer end of the chamber. The deep diagonal ribs K K also aid in driving the cotton forward.

Having now fully explained our invention, what we claim, and desire to secure by Letters Patent, is—

1. The diagonally-inclined ribs K on the under side of the cover B, in combination with the shaft C, provided with the fans and beaters, and inclined slats H H, forming the bottom of the chamber of our invention, and provided with the flaring opening I, substantially as shown and described, and for the purposes set forth.

2. The fans G G, set on the lower or outer end of the inclined shaft C, carrying beaters F, and at right angles to said shaft, said fans being constructed as shown and described, substantially as and for the purposes herein set forth.

3. In a cotton-cleaner, the inclined shaft C, provided with the fans G G, set at right angles with said shaft, and near its outer or lower end, in combination with the beaters or arms F F, set in rows on said shaft, substantially as shown and described, and for the purposes set forth.

4. The inclined shaft C, provided with the fans G G and the beaters F F, in combination with the rectangular cover B, provided with the diagonally-inclined ribs K, substantially as described, and for the purposes set forth.

5. The longitudinal inclined slats H H, forming a semicircular bottom to the inclined chamber, of which B is the cover, in combination with the shaft C, provided with the fans G G and the beaters F, substantially as shown and described, and for the purposes set forth.

In testimony that we claim the foregoing we have hereunto set our hands this 8th day of March, 1878.

GERALDUS GAY.
WM. KELLIS.

Witnesses:
S. D. CHAMBERLIN,
A. M. CHAMBERLIN.